United States Patent
Maischberger et al.

(10) Patent No.: US 9,174,341 B2
(45) Date of Patent: Nov. 3, 2015

(54) WORKING DEVICE AND METHOD

(75) Inventors: Johann Maischberger, Dinkelscherben (DE); Reinhold Neider, Langweid (DE); Albrecht Hoene, Lappersdorf (DE)

(73) Assignee: KUKA SYSTEMS GMBH, Augsburg (DE)

(*) Notice: Subject to any disclaimer, the term of this patent is extended or adjusted under 35 U.S.C. 154(b) by 19 days.

(21) Appl. No.: 14/129,591

(22) PCT Filed: Jul. 4, 2012

(86) PCT No.: PCT/EP2012/062972
§ 371 (c)(1),
(2), (4) Date: Dec. 27, 2013

(87) PCT Pub. No.: WO2013/007565
PCT Pub. Date: Jan. 17, 2013

(65) Prior Publication Data
US 2014/0135987 A1    May 15, 2014

(30) Foreign Application Priority Data
Jul. 8, 2011 (DE) ............... 20 2011 103 223 U

(51) Int. Cl.
*G05B 19/04* (2006.01)
*B25J 9/16* (2006.01)
*B25J 15/00* (2006.01)

(52) U.S. Cl.
CPC .............. *B25J 9/1633* (2013.01); *B25J 9/1694* (2013.01); *B25J 15/0019* (2013.01); *Y10T 29/49826* (2015.01); *Y10T 29/53* (2015.01)

(58) Field of Classification Search
CPC ..................................................... B25J 9/1633
USPC ......... 318/568.21, 568.2, 568.11, 568.1, 567, 318/560
See application file for complete search history.

(56) References Cited

U.S. PATENT DOCUMENTS

| 4,432,063 | A | * | 2/1984 | Resnick ................... 700/250 |
| 4,553,077 | A | * | 11/1985 | Brantmark et al. ...... 318/568.13 |
| 4,834,355 | A | * | 5/1989 | Fan ........................ 269/181 |
| 5,970,812 | A | * | 10/1999 | Fan et al. ................ 74/424.78 |
| 2007/0214919 | A1 | | 9/2007 | Ehleiter et al. |
| 2010/0319182 | A1 | | 12/2010 | Sugimoto et al. |

FOREIGN PATENT DOCUMENTS

| DE | 103 54 079 A1 | 6/2005 |
| DE | 10 2008 018 848 A1 | 10/2009 |
| JP | 0 160 951 A2 | 11/1985 |
| JP | 07 214435 A | 8/1995 |
| JP | 08 011083 A | 1/1996 |
| JP | 2000 108064 A | 4/2000 |
| JP | 2002 331428 A | 11/2002 |

* cited by examiner

*Primary Examiner* — David S Luo
(74) *Attorney, Agent, or Firm* — McGlew & Tuttle, P.C.

(57) ABSTRACT

A screwing device (1) and a screwing method use a multi-member (12, 13, 14, 15) robot (6) having a driven rotational axis. The robot (6), on its last member (12), carries a rotational device (7) with a rotational tool (8). The rotational device is driven independently and is provided and designed for rapidly screwing a rotating part (3) on or off. The screwing tightening or untightening of the rotating part (3) is performed by the robot (6) and in particular by the robot end member (12).

15 Claims, 7 Drawing Sheets

WORKING DEVICE AND METHOD

CROSS REFERENCE TO RELATED APPLICATIONS

This application is a United States National Phase Application of International Application PCT/EP2012/062972 filed Jul. 4, 2012 and claims the benefit of priority under 35 U.S.C. §119 of German Utility Model Application DE 20 2011 103 223.3 filed Jul. 8, 2011, the entire contents of which are incorporated herein by reference.

FIELD OF THE INVENTION

The present invention pertains to a working device and a method for rotational joining and/or for rotational loosening, especially a screwing device, for the rotational joining and/or loosening of rotary parts, especially screws or nuts, with a multi-member robot with a driven axis of rotation, wherein the robot carries on its end member an independently driven rotating device with a rotating tool.

BACKGROUND OF THE INVENTION

Screwing robots, which consist of a conventional articulated-arm robot, which carries at its end member, e.g., a multiaxially movable robot hand, a screwing device, which carries out the entire screwing process. The robot and the screwing device have drives of their own and controls of their own. In addition, a system control with a sequence program is present. Such screwing robots require a great construction effort and a large amount of installation effort, and their flexibility is limited. The required safety efforts with safety fence, etc., are great.

SUMMARY OF THE INVENTION

The object of the present invention is to provide a better working device and a method for rotational joining and/or rotational loosening.

According to the invention, a working device is provided for the rotational joining and/or loosening of rotary parts. The working device comprises a multi-member robot with and end member having a driven axis of rotation, a tool and an independently driven rotating device. The tool is connected to the independently driven rotating device for rotating the tool. The end member of the robot carries the independently driven rotating device with the tool. The independently driven rotating device defines means for rapidly screwing in or unscrewing rotary parts and wherein the robot end member defines means for tightening or untightening the rotary parts.

In the state of the art, the robot performs only manipulating tasks and positions the screwing device. It does not participate itself in the rotational joining process, especially in the screwing process.

In the working device being claimed, especially the screwing device, and in the method, the robot is involved in the rotational joining or loosening process itself. Said process may be, e.g., a screwing process. The robot has a plurality of functions. On the one hand, it carries, manipulates and positions a rotating device, which is used to screw in (turn in) or unscrew (turn out) a screw or another rotary part. On the other hand, it performs the tightening or loosening of the rotating part by a rotary motion of its own. The rotating device being carried along by the robot can have a reduced function and be used only for screwing in or unscrewing rapidly. The rotary mobility of the rotating device can be blocked for the subsequent tightening or for the preliminary loosening. The rotating device is stiffened hereby and the rotary motion of the robot is transmitted to the screw or the like for tightening or untightening.

The working device may have a suitable sensor device, which may possibly be a multi-part sensor system, in order to carry out the rotational joining and/or rotational loosening process and in order to detect events relevant for the process steps, which may possibly be documented. It may also detect loads, e.g., the tightening torque occurring on or to be applied to the rotating part or an initial breakaway torque or untightening torque and the drop thereof, as well as rotary motions and rotary positions. A plausibility check can be performed during load detection based on rotation or position detection. Sensor systems already present, especially integrated in the robot can advantageously be used, which are especially reliable due to redundancy. The rotational joining or loosening process can be carried out with the sensor system and the mechanism controlled thereby especially reliably and accurately, and monitoring, logging and quality assurance are also possible.

The construction effort and control effort for the working device being claimed can be substantially reduced compared to the state of the art. Parts and functionalities of the robot that are present anyway can be used for the rotational joining or loosening process. The entire process can be controlled via an existing robot control, and, e.g., the rotating device may be integrated as an additional axis or as additional axes.

Due to the division of the functions, the robot and the rotating part with their designs and functions can be used optimally and adapted to the requirements of the process, which is especially favorable for the performance capacity and the economy of the working device. In particular, parts and functions already present in the robot can be used and the rotating device can be correspondingly simplified.

The construction effort for the rotating device and the functionality as well as the weight of this rotating device can be reduced compared to the prior-art screwing devices. The working device being claimed makes it possible, furthermore, to use lightweight and mobile robots. The working device is therefore mobile itself and can be used at any desired location. It can also be transferred rapidly from one site of use to another and installed there. The effort needed for set-up is low.

In addition, the use of a robot with at least one resilient axis is favorable. This reduces the risk of accidents and reduces the safety effort that was necessary until now. In addition, such a robot can be taught and programmed more rapidly and more simply. It can compensate any possible position or part tolerances on the workpiece and/or rotating part independently, which reduces the accuracy and effort needed for programming the robot.

The working device being claimed has a high performance capacity. The screwing in or unscrewing of a screw or the like can be carried out by the corresponding designed rotating device at a high speed and in a very short time, and high torques are not necessary. A limited angle of rotation is sufficient for tightening or untightening, and a stronger force or torque is necessary for tightening or the torque is applied by the robot. The rotating device can be relieved from load and simplified in its precision. On the whole, the rotational joining or loosening process can be carried out rapidly, reliably and with high precision.

The working device may have a holding device, with which a rotating part can be pick up and held for being fed to the joining site, and for being positioned and screwed in there. The working device can operate autarchically as a result and carry out the entire rotational joining process, including picking up, feeding and positioning of a rotary part.

A robot with at least one resilient axis is especially well suited for reliably guiding and positioning the rotating device with the rotating part before and during the rotational joining or loosening process. Advantages arise especially in connection with the adjustment of the rotating part during the axial rotary feed and also during the lateral guiding of the rotary part at right angles to the rotational joining axis. The robot can also apply a defined normal force in the axial direction of the rotational joining axis. The energy supply of the rotating device and the communication lines can be led through the hollow shafts of the robot. Measurement results of the sensor system, especially the measured torques, are affected less as a result than in case of external cables.

The working device may be used in the widest variety of industrial areas, e.g., for assembly tasks on household appliances or office equipment. Especially, it can turn in screws into threaded holes and tighten them or it can untighten and unscrew them. Conversely, it can also place nuts on screws and fasten and unfasten them. It can also establish other rotational joining connections, e.g., bayonet connections or the like.

In one preferred exemplary embodiment, the working device has a sensor system that detects a rotation of the end member, especially a driven element.

In one preferred exemplary embodiment, the working device has a sensor system that detects a rotation of the rotating device.

In one preferred exemplary embodiment, the working device has a sensor system that detects a tightening torque and/or an initial breakaway torque.

In one preferred exemplary embodiment, the working device has a sensor system that detects a screwing-in torque and/or an unscrewing torque.

In one preferred exemplary embodiment, the sensor system of the working device has one or more sensors for detecting torques and/or angles of rotation, which are arranged on the end member, especially on the driven element thereof.

In one preferred exemplary embodiment, the sensor system of the working device has at least one sensor for detecting torques and/or angles of rotation, which is arranged on the rotating device.

In one preferred exemplary embodiment, the sensor system of the working device is designed as at least partly redundant.

In one preferred exemplary embodiment, the rotating device has a rotating tool arranged rigidly or detachably.

In one preferred exemplary embodiment, the rotating device has a controllable rotating drive, especially a controllable electric motor with a gear mechanism.

In one preferred exemplary embodiment, the rotating device has a tool receiving socket connected to the rotating drive.

In one preferred exemplary embodiment, the driven element has a controllable rotating drive, especially a controllable electric motor with a gear mechanism.

In one preferred exemplary embodiment, the driven element has a controllable brake.

In one preferred exemplary embodiment, the robot has a plurality of members connected to one another in an articulated manner with axes (I-VII), especially axes of rotation, driven in a controlled manner.

In one preferred exemplary embodiment, an at least three-member robot has an end member, a basic member and at least one intermediate member.

In one preferred exemplary embodiment, the robot has one or more sensors for detecting the load of at least one of its members, especially for detecting the forces and/or torques acting.

In one preferred exemplary embodiment, the programmable robot has only one position control for its axis (axes) (I-VII).

In one preferred exemplary embodiment, the robot is designed as a mobile robot.

In another preferred exemplary embodiment, the rotary mobility of the rotating device can be blocked by means of a coupling controllable by the robot in order to transmit the rotary motion and a tightening or untightening torque of the robot to the rotating part. The coupling is formed between the driven element of the robot and the rotating tool and can connect the driven element directly to the driven element or end member of the robot for transmitting the motion and torque. The mechanical coupling can be closed and opened especially by a feed motion of the robot, as a result of which separate driving and control means are dispensable. In addition, the robot can rotate the rotating tool in the manner of a ratchet by repeated closings and openings and intermediate back rotations. This is advantageous if the robot and especially its driven member have limited angles of rotation and a greater angle of rotation is necessary for tightening or untightening.

A sensor system at the rotating device can be omitted in the variant of the rotating device. Rotary motions of the independently driven rotating device during screwing in or unscrewing can be detected by the robot's own sensor system based on the forces of reaction and moments of reaction at the connection site to the robot, especially to the driven element. As an alternative, the rotating drive of the rotating device can detect its own rotary motions and torques via the drive's independent sensor system, especially by measuring the motor current. A low manufacturing and control effort is likewise sufficient for this.

The invention may include further advantageous features. The end member may comprise a driven element that is rotatable about the driven axis and a controllable rotating drive connected with the driven element. The rotating device may be arranged at the driven element. The end member may comprise a driven element provided and designed for tightening or untightening the rotary part. The rotating device may comprises a controllable rotating drive with an axis of rotation. The rotating device may have a rotating device axis of rotation. The rotating device axis of rotation and the driven axis of the driven element may be aligned with one another. The blocking device may comprise a controllable brake, locking device or locking mechanism for blocking the rotary mobility of the rotating drive. The closed coupling may transmit rotary motions and torques of the robot to the rotating tool. The working device may further comprise a holding device for picking up a loose rotary part. The working device may further comprise a dispenser device for dispensing loose rotating parts. The working device may further comprise a robot control wherein at least one of the end member and the driven element, on the one hand and the rotating device on the other hand is controlled jointly by the robot control. The sensor system may be connected to the robot control. The sensor system may at least be partially arranged in one of the robot and the rotating device. The sensor system may have a first sensor for detecting a load or applied torque, with the first sensor being arranged at at least one robot axis, and a second sensor for detecting at least one of a rotary motion and a rotary position. The sensor system may comprise a sensor in the rotating device of the rotating drive to detect a rotary and a driven motion of the rotating drive and of the rotating tool.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
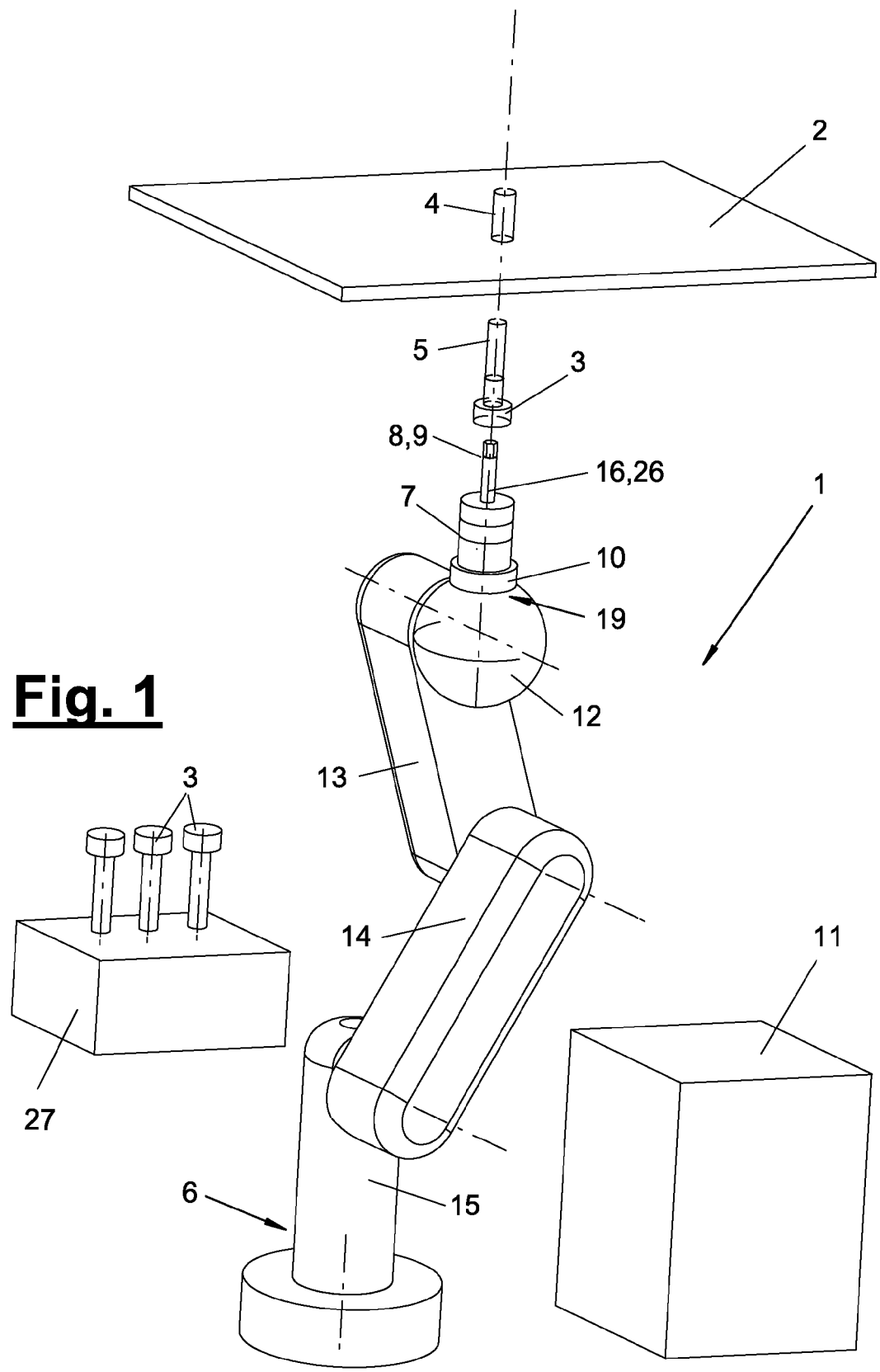
FIG. 1 is a perspective and exploded view showing a working device with a rotating part, workpiece and dispenser device.

Referring to the drawings in particular, the present invention pertains to a working device (1) for the rotational joining and/or rotational loosening of rotary parts (3). The present invention pertains, furthermore, to a rotational joining and loosening method and to a method for using such a working device (1).

A rotary part (3) is connected to a rotary receptacle (4) during rotational joining and/or loosening. An additional function with clamping, fastening or the like of another part may be associated herewith. A relative motion is carried out during rotational joining and/or loosening between the rotary part (3) and the rotary receptacle (4), which comprises at least one rotation and possibly a linear motion, e.g., an axial feeding or retracting motion. The exemplary embodiments explained below show a rotational joining process, which is designed as a screwing process. The rotary part (3) is a screwed part. It may be, e.g., the screw shown in the drawings with a shank and with a thread (5) as well as with a screw head. It is screwed, for example, into a rotary receptacle or screw socket/receptacle (holding fixture) (4), e.g., a threaded hole, in a workpiece (2). The assignment of the screw may also be reversed, in which case the rotary part (3) is a nut with internal screw thread, which is screwed onto a rotary receptacle (4) designed as a stud.

The workpiece (2) is indicated schematically in FIG. 1. It may be of any type, size and design. For example, it is a housing of a device, e.g., of a washing machine, on which a lid (not shown) is fastened by means of screws (3). Any other embodiments of the workpiece and fields of use of the working device (1) are possible as well.

The rotational joining process, e.g., screwing process, can be carried out in a plurality of consecutive steps. The rotary part (3) can be screwed in in a first step after positioning, while the rotary part (3) performs one or preferably more full revolutions, while, e.g., a feed motion also takes place at the same time. Little force or torque is often necessary during screwing in, and the path over which the rotating part is screwed in and the speed are more important. The screwing in is followed by tightening, which requires a greater torque with a limited angle of rotation of, e.g., less than 360°, and with which, for example, a rotary connection, especially a screw connection, is, e.g., secured by clamping or the like. Tightening is also called fastening of a rotary part, e.g., a screw. What is in the foreground here is the torque as well as a possibly necessary precision in terms of the value and possibly also of the development of the tightening torque rather than the speed.

In the embodiment shown in FIG. 1, the working device (1) has a multi-member robot (6) and a rotating device (7). Furthermore, a dispenser device (27) for one or more rotary parts (3) may belong to the working device (1). The working device (1) may have, furthermore, a control (11), which is designed, e.g., as a robot control. The control (11) may control the robot (6) and the rotating device (7) jointly. As an alternative, separate controls, possibly with a mutual coupling, are possible.

The robot (6) and the rotating device (7) are jointly involved in the rotational joining process. The robot (6) carries the rotating device (7), which in turn rotationally engages the rotary part (3) via a rigidly or detachably arranged rotating tool (8). The robot (6) manipulates and guides the rotating device (7), and the rotary part (3) is fed to the joining site, especially the rotary receptacle (4), and is positioned there. The subsequent screwing in of the rotary part (3), e.g., the screw, is performed by the rotating device (7) independently. The subsequent tightening is assumed by the robot (6) and it performs a rotary motion for this. The robot (6) has an end member (12) for this with a rotating driven element (10), at which the rotating device (7) is arranged with a rotary stiff connection (such that it is adapted to rotate in unison).

The working device (1) may have, besides, a holding device (9) for picking up and holding a loose rotary part (3). The holding device (9) may be arranged, e.g., at the rotating tool (8). It can be used, e.g., to pick up and securely grip a rotary part (3) at the dispenser device (27).

Figure 2:
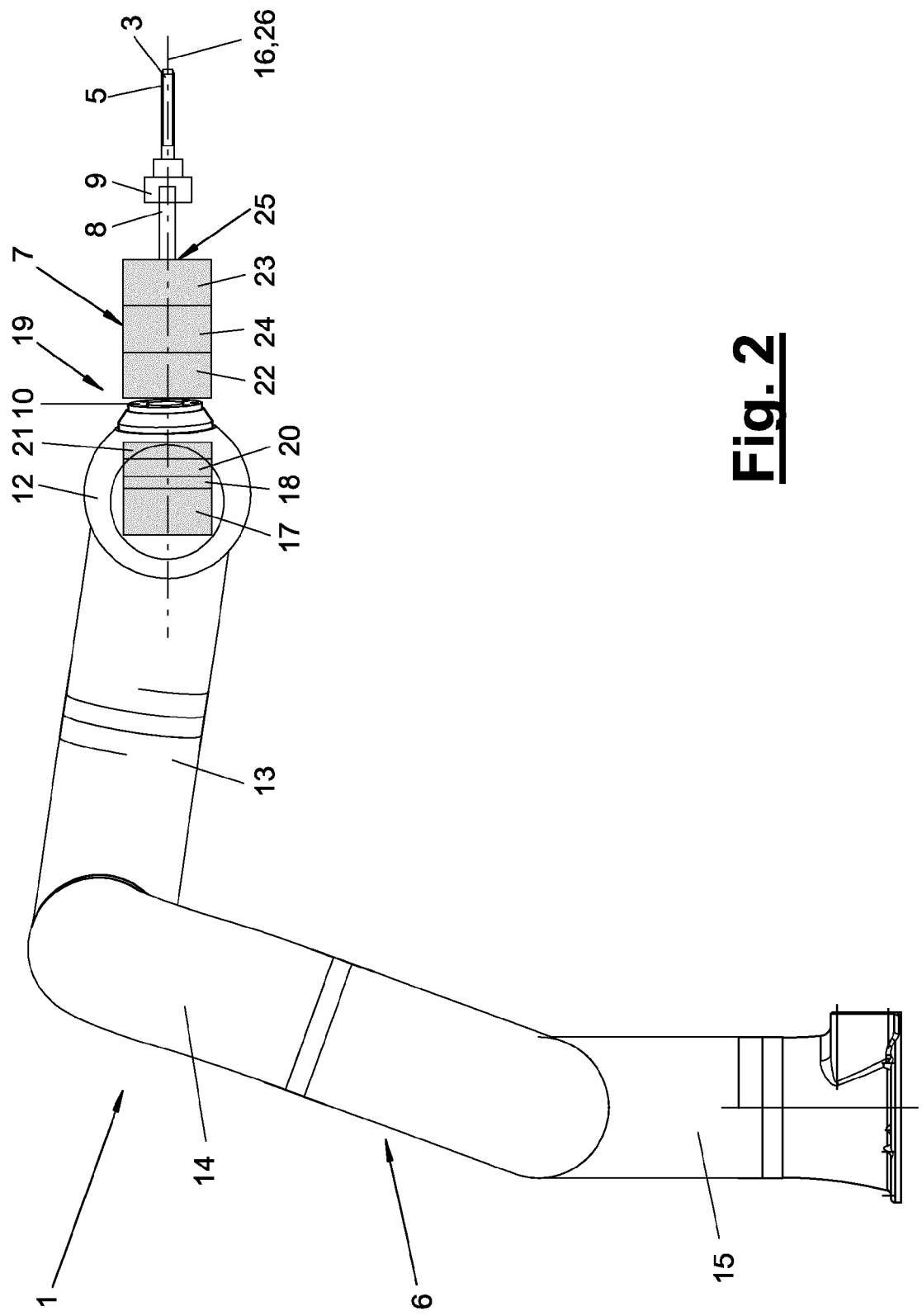
FIG. 2 is a side view showing a robot with a rotating device and a schematic representation of the components.

The rotating device (7) shown schematically in FIGS. 1 and 2 has on the driven side an axis of rotation (26), which is flush with the axis of rotation of the rotary part (3) and of the rotating tool (8). The rotating device (7) is designed to perform rotary motions and is driven and can be controlled independently. To tighten the rotary part (3) by means of the rotary motion performed by the robot (6), the rotary mobility of the rotating device (7) can be blocked. It is stiffened hereby, so that the rotary motion of the robot (6) is transmitted to the rotating tool (8) preferably without slipping.

FIG. 2 schematically shows the design of a rotating device (7), which is also called screwing-in device. It comprises, on the one hand, a rotating drive (22), which can be controlled and is preferably connected to the robot control (11). The rotating drive (22) comprises, e.g., a controllable electric motor and possibly an associated gear mechanism. The rotating drive (22) is designed, e.g., for high speed at a low torque. The speed can be controlled and adapted to the requirements arising during screwing in.

The stator of the rotating drive (22) is connected to in a rotary stiff manner with the plate or flange of the driven element (10). The connection may be detachable, in which case an automatic changeover coupling may be inserted. The robot or the driven part is designed, e.g., as a motor spindle and is connected to the rotating tool (8).

The rotating device (7) has, furthermore, a blocking device (23). This may be, e.g., a brake for the driven part of the rotating drive (22). A locking device, a locking mechanism or the like is possible as an alternative. The blocking device (23) may likewise be controllable or switchable and connected to the control (11).

Furthermore, the rotating device (7) has the rotating tool (8), which is arranged rigidly or detachably and whose design and arrangement are adapted to the respective rotary part (3). The rotating device (7) may have, e.g., a tool receiving socket (25) for detachably and replaceably arranging a rotating tool (7). This may be, e.g., a plug-in socket or the like. A rotating tool (8) may be designed, e.g., as a screwdriver blade, Allen wrench, open-end wrench or ring wrench or the like.

The holding device (9) may be, e.g., a magnetized end area of the rotating tool (8), which is advantageous for rotary parts made of steel or other magnetizable materials. As an alternative, or in addition, the holding device (9) may be designed as a controllable gripper, suction device or spanner for grasping and holding a rotary part (3), e.g., a screw head.

The working device (1) has a sensor system (19), which may have one or more functions and which is likewise connected to the control (11). The sensor system (19) may detect, e.g., an end of the screwing-in operation and report it to the control (11), which will then switch off the rotating drive (22) and switch on the blocking device (23) and actuate the robot (6) to carry out a rotary motion for tightening the rotary part (3). The end of the screwing-in operation can be detected in different ways, e.g., based on an increase in the mechanical resistance and in the torque necessary for the rotation, via a path or position measurement, by a stop or a contact or the like.

The sensor system (19) can detect, furthermore, a tightening torque. This can be compared with a preset value, and the rotary motion of the robot (6) is controlled correspondingly. The sensor system (19) may possibly also detect a screwing-in torque in order to detect from this the end of the screwing-in motion or, if applicable, also affect, especially control, the screwing-in motion.

The sensor system (19) may be designed, furthermore, for detecting rotary motions and/or rotary positions. This may pertain to the rotary motion of the rotating device (7) and/or of the robot (6). The motion or position values can be used to monitor the function of the rotating device (7) and/or of the robot (6) in respect to the actual performance of rotary motions. They can be used, besides, for plausibility check and related with simultaneously detected loads, especially torques. It can thus be detected whether an increase in load, especially an increase in torque, is based on a rotary motion and signals the end of the screwing-in motion or the fact that a tightening torque has actually been reached or whether there is a malfunction, e.g., a damage to the thread.

The sensor system (19) may be designed at least partly as a redundant system. It has now, e.g., two or more identical and simultaneously detecting sensors, whose results are compared and analyzed, in order to verify that the physical effects sensed are true to reality.

The multi-member robot (6) has the end member (12) mentioned, which is designed, e.g., as a robot hand. The end member (10) has, in turn a rotatable driven element (10), which is designed, e.g., as a driven flange and rotates about an axis (16), which is arranged in parallel to the axis of rotation (26) of the rotating drive (7) and is preferably flush with this. The robot side axis of rotation (16) may also be flush with the axis of rotation of the rotating tool (8) and of the rotary part (3).

The driven element (10) has a controllable rotating drive (17), which is connected to the robot control (11). The rotating drive (17) comprises, e.g., a controllable electric motor and a gear mechanism possibly associated with it. Furthermore, a switchable or possibly controllable brake (18) or another means for blocking and fixing the driven element (10) may be associated with the driven element (10). The angle of rotation of the driven element (10) may be limited. One or more lines for operating materials, e.g., power and signal currents, fluids, etc., may be led through a possibly hollow driven element (10) and possibly other members (13, 14, 15) of the robot and exit to the outside at the flange.

The end member (12), preferably the driven element (10) thereof, performs the final motion for tightening the rotary part (3), wherein the rotating drive (17) and the brake (18) are correspondingly affected by the robot control (11). The brake (23) of the rotating device (7) is actuated and the brake (18) is released. The characteristics of the rotating drives (17, 22) may be different, especially opposite, especially in terms of speed of rotation and torque. For example, the robot-side rotating drive (17) may be designed for a lower speed of rotation and higher torque and the rotating drive (22) for a higher speed of rotation and a lower torque.

The above-mentioned sensor system (19) is associated with the rotating device (7) and/or the robot (6), especially the end member (12). It may have various designs for this.

Parts of the sensor system in the rotating device (7) may be balanced (compared) with parts of the sensor system located in the robot (6), especially in the end member (12) (redundancy).

A sensor (20), which measures an occurring load and is designed, e.g., as a torque sensor or a so-called articulation torque sensor, is associated with the driven element (10) in the exemplary embodiment being shown. Another sensor (21) is likewise associated with the driven element (10), and this sensor detects the rotary motion or position of said driven element and is designed, e.g., as a rotation sensor. The sensors (20, 21) may be present as multiple sensors, e.g., as double sensors, for reasons of safety and redundancy. They are likewise connected to the robot control (11).

The tightening torque and possibly also the screwing-in torque can be detected via the load sensor (20). A resistance increasing with increasing depth of penetration during the screwing-in motion or a resistive torque of the rotating device (7) is transmitted to the driven element (10) and can be detected here. With the rotating device (7) blocked, the tightening torque is detected directly via the driven element (10). It can be detected at the same time in the above-mentioned manner by means of a position or rotation sensor (21) whether the driven element (10) performs a rotary motion and what kind of rotation motion it performs. A sensor is defined here as a sensor that detects rotational variables, such as angle of rotation, speed of rotation and the like.

The sensor system (19) may comprise, furthermore, a sensor (24) at the rotating device (7), which is possibly present as multiple sensors and may have different designs.

The sensor (24) is designed, for example, as a position sensor or rotation sensor, which detects a rotary and driven motion of the rotating drive (22) and of the rotating tool (8). The presence and the nature of a rotary motion of the rotating device (7) can be sensed by means of the sensor (24) during the detection of the screwing-in torque via the load sensor (20) and analyzed together with the load signal.

Sensor (24) may have a simpler design and a lower precision than the robot-side sensor (21). Sensor (24) may also be omitted.

Robot (6) has a plurality of movable members (12, 13, 14, 15), which are connected to one another. The members (12, 13, 14, 15) are preferably connected to one another in an articulated manner and via rotating axes (I-VII). It is possible, furthermore, that individual members (13, 14) are multipart members and are movable in themselves. The robot (6) is designed in the embodiment being shown as an articulated-arm robot and has seven driven axes or axes of motion (I-VII). The axes (I-VII) are connected to the robot control and can be controlled and possibly regulated. The driven axis of rotation (16) is, for example, the robot axis (VII).

Robot (6) is programmable, and the robot control (11) has a computing unit, one or more memories for data and programs as well as input and output units. The rotating device (7), especially its rotating drive (22), may be implemented, e.g., as a controlled axis (VIII) in the robot control (11). The robot control (11) may store process-relevant data, e.g., sensor data, and log them for a quality control and quality assurance.

The so-called axes (I-VII) have a pivot bearing or an articulation and a controllable, possibly regulatable rotating drive, which is associated and possibly integrated here. The axes (I-VII) may also have a controllable or switchable brake and a possibly redundant sensor system, e.g., according to the above-described type of the axis of rotation (16) or axis (VII) with sensors (20, 21) for detecting loads, especially torques and rotary motions and possible rotation positions.

The robot (6) preferably has three or more movable members. In the exemplary embodiment being shown, it has a basic member (15), which is connected to the foundation, e.g., a base, and the aforementioned end member (12) as well as two intermediate members (13, 14). The intermediate members (13, 14) are multipart members and are designed as rotatable in themselves by means of axes (III) and (V). The number of intermediate members (13, 14) may be lower or higher as an alternative. Individual intermediate members or all intermediate members (13, 14) may be designed in another variant as members that are relatively rotationally fixed (rotationally stiff—adapted to rotate in unison and without additional axes).

The robot (16) may have one or more force-controlled or force-regulated axes (I-VII) or force-controlled or force-regulated axis drives between the members (12, 13, 14, 15). The robot (6) may have especially one or more resilient axes (I-VII) or resilient axis drives with resilience (flexibility) regulation. The resilience regulation may be a pure force regulation or a combination of position and force regulation. Such a resilient axis may be used advantageously for the rotational joining process in various respects. On the one hand, the robot (6) can hold and guide the rotating device (7) in a springy manner in such a way that it is able to perform an evading motion, as a result of which it is possible to avoid, e.g., crashes and especially accidents with persons. This property can also be used for manual teaching and programming. In addition, it is possible to support and facilitate the search for and the finding of the joining position, especially of the rotary receptacle (4), by means of load detection with the robot's sensor system at the axes (I-VII). Angle errors in the relative positions of the members (12, 13, 14, 15) can also be detected and corrected if necessary.

One or more flexible axes are, moreover, advantageous for adjusting the rotating device (7) during screwing in corresponding to the feed. The robot (6) can apply, in addition, a defined pressing force during rotational joining in the axial direction of the rotational joining or screwing axis. This is advantageous, e.g., for sheet metal screws, self-tapping screws or the like. It is likewise favorable for this purpose if the robot (6) has one or more force- and possibly position-regulated axes (I-VII).

As an alternative, or in addition, the robot (6) may have one or more driven axes (I-VII) without resilience and, e.g., with an exact position control or position regulation.

Figure 3:
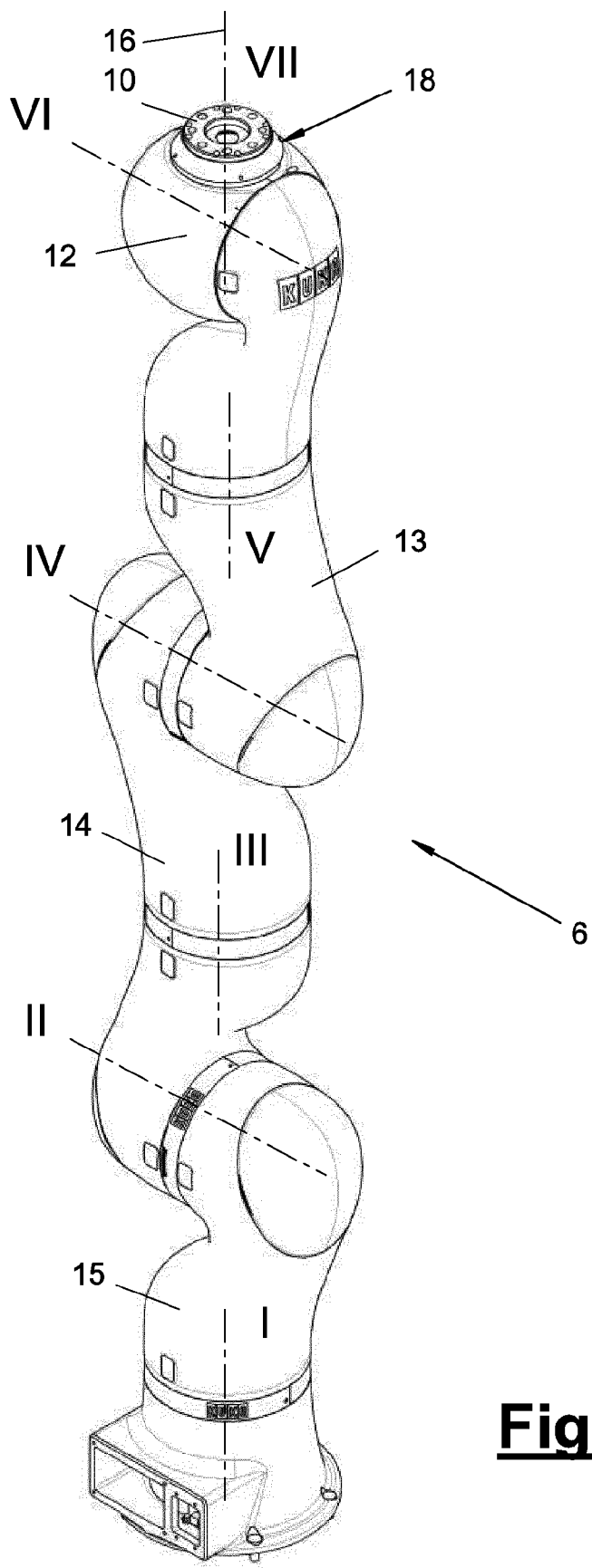
FIG. 3 is a perspective view showing a lightweight robot with resilient axes.

FIG. 3 shows the robot (6) according to the exemplary embodiment in a stretched position and illustrates the design of the members (12, 13, 14, 15) and of the driven and controllable or regulatable axes (I-VII). The divided designs of the elongated intermediate members (13, 14) with the respective axis of rotation (III) and (V) integrated here are shown here as well. The supply lines for the operating materials are led in the interior of the members (12, 13, 14, 15), which have, e.g., hollow shafts for this purpose at the articulations or pivot bearings.

The robot (6) being shown is designed as a lightweight robot and consists of lightweight materials, e.g., light metals and plastic. It also has a small overall size. The rotating device (7), which has a simplified construction and function, likewise has a low weight. The working device (1) has, as a result, on the whole, a low weight and can be transported without major effort and transferred from one site of use to the other. The weight of the working device (1) may be less than 50 kg, especially about 30 kg. Due to the possibility of manual teaching, the working device (1) can be programmed, put into operation and adapted to different rotational joining or screwing jobs in a short time and in a simple manner.

Instead of, or in addition to, the above-described rotational joining process, the working device (1) can also carry out a rotational loosening process, in which, e.g., a screw or another rotary part (3) is loosened on a rotary receptacle (4) and possibly removed. The rotating tool (8) is caused for this to engage the fixed rotary part (3) and an untightening or initial breakaway torque is subsequently applied. This is generated by the robot (6), preferably with the end member (12), especially with the driven element (10) of said end member. The end of the untightening operation can be detected by means of the above-described sensor system (19), which is detected, e.g., based on a detected drop in the initial breakaway torque. The presence of a rotary motion can also be sensed here in order to have a plausibility check. Furthermore, it can be determined with another part of the sensor system (19), e.g., via sensors at the robot axes (I-VII), whether the rotating tool (8) remains connected to the rotary part (3) during the rotation or whether it separates from it and the robot (6) performs a corresponding evading motion.

As soon as the robot control (11) determines by means of the sensor system (19) that the untightening or breakaway operation has been terminated, the rotating drive of the robot or of the driven element (10) can be switched off and the rotating device (7) can be switched on, and the latter will then bring about the unscrewing of the rotary part (3) after releasing its blocking device (23). The robot (6) can follow this unscrewing motion in the axial direction with a corresponding retracting motion. The end of the unscrewing motion can likewise be detected in a suitable manner, e.g., by monitoring the unscrewing torque, which drops when the rotary part (3) becomes separated from the rotary receptacle (4). The robot (6) can remove the free rotary part (3) with the holding device (9) and deposit it at a suitable location.

FIGS. 4 through 7 show a variant of the rotating device (7) in different views. This rotating device (7) is especially suitable for use with tactile robots (6) of the above-described type, which have one or more force-controlled or force-regulated robot axes (I-VII) or axis drives or even such axes or axis drives with a flexibility regulation.

The rotating device (7) shown has a frame (28), which has a flange-like connection (30) for connection to the driven element (10) of the robot (6). Frame (28) has, furthermore, a web (31), which extends along the driven axis (16) and along the axis of rotation (26) of the rotating tool (8), which said axis of rotation (26) is flush in this variant as well, and which said web is connected at one end to the connection (30) and at the other end to a transversely positioning holding leg (32), at which a rotating drive (22) is arranged in a laterally offset position.

Figure 5:
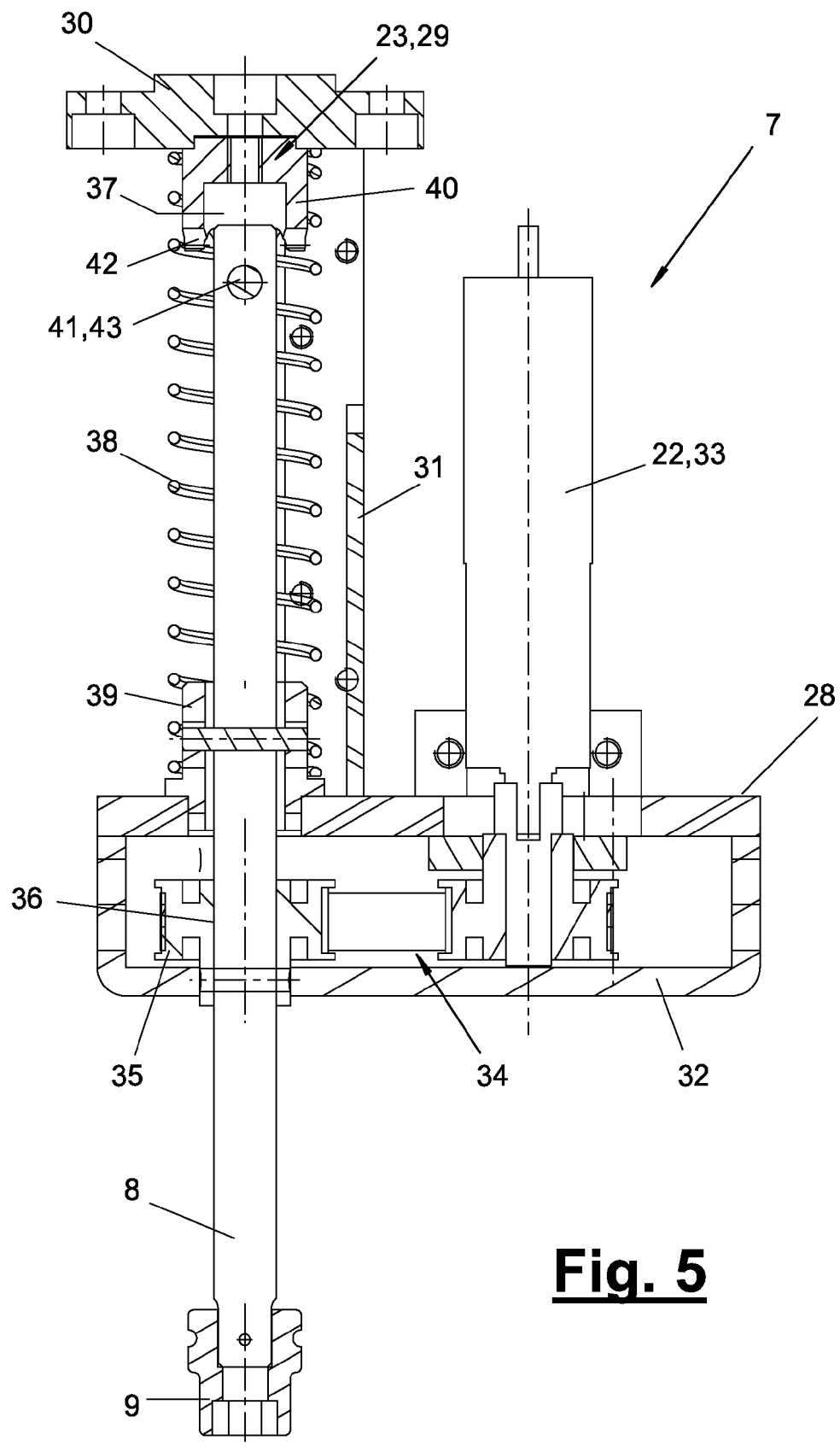
FIG. 5 is a tilted longitudinal sectional view through the rotating device according to FIG. 4.

Rotating drive (22) has, according to the sectional view in FIG. 5, a motor (33) and a gear mechanism (34) arranged downstream, e.g., a belt drive, whose driven element (35), e.g., a pinion, is connected to the rotating tool (8) passed through in a rotationally engaged manner. Motor (33) is preferably designed as an electric motor, especially as a d.c. motor. The above-mentioned sensor (24) can be associated with the motor (3) and can detect, e.g., the motor current. It can be determined from this whether the motor (33) and hence also the rotating tool (8) are rotating and if so, with what force or with what torque.

The rotating tool (8) is designed in this exemplary embodiment as a shaft, preferably as a polygon shaft and has at its lower end a holding device (9) for a rotary part (not shown). The rotating tool (8) is guided rotatably about its longitudinal and driven axis (26) and, in addition, axially displaceably in the rotating device (7), especially in frame (28). The guide may be formed by a shaft guide (36) in the driven element (35) and by a shaft guide (37) at the connection (30). The shaft guide (36) is rotationally engaged and permits axial motions. The frame-side shaft guide (37) permits rotations and axial displacements of the rotating tool (8).

The rotating tool (8) is biased on an axial direction by a resetting element (38), e.g., a spring wound up on the upper end of the shaft. A spring support (39), on which the end of the spring (38), which end is the lower end in FIG. 5, is supported, is arranged at the rotating tool (8) and is preferably connected in a rotary stiff manner. The upper end of the spring is supported at the connection (30) and can extend over the shaft guide (37). The resetting element (38) or the spring, especially compression spring, acts in the axial direction (26) and presses the rotating tool (8) away from the connection or flange (30). The holding leg (32) has a through opening for the rotating tool (8), and it can be enlarged on the top side and it offers a mount for the spring support (39).

The rotating device (7) has a coupling (29), which is formed between the driven element (10) or the end member (12) and the rotating tool (8). The coupling (29) can be controlled or actuated by the robot (6). It can be closed and opened especially by a preferably linear feed motion of the robot (6). The coupling (29) is used to transmit corresponding rotary motions and torques of the robot (6) to the rotating tool (8) in the closed position for tightening or untightening a rotary part (3). The coupling (29) blocks the rotary mobility of the rotating device (7) by the direct drive connection between the robot (6) and the rotating tool (8) and forms an embodiment of the blocking device (23).

The coupling (29) has a coupling element (40) at the frame (28) and a coupling element (41) meshing with same at the rotating tool (8). The coupling elements (40, 41) transmit rotary motions and torques of the robot (6) to the coupled rotating tool (8) in the closed position of the coupling (29) and they preferably mesh for this in a positive-locking manner.

The coupling (29) may have various designs in terms of construction. It may be, in particular, a claw coupling, a crown gear coupling or the like. A claw coupling is used in the exemplary embodiment being shown.

Figure 4:
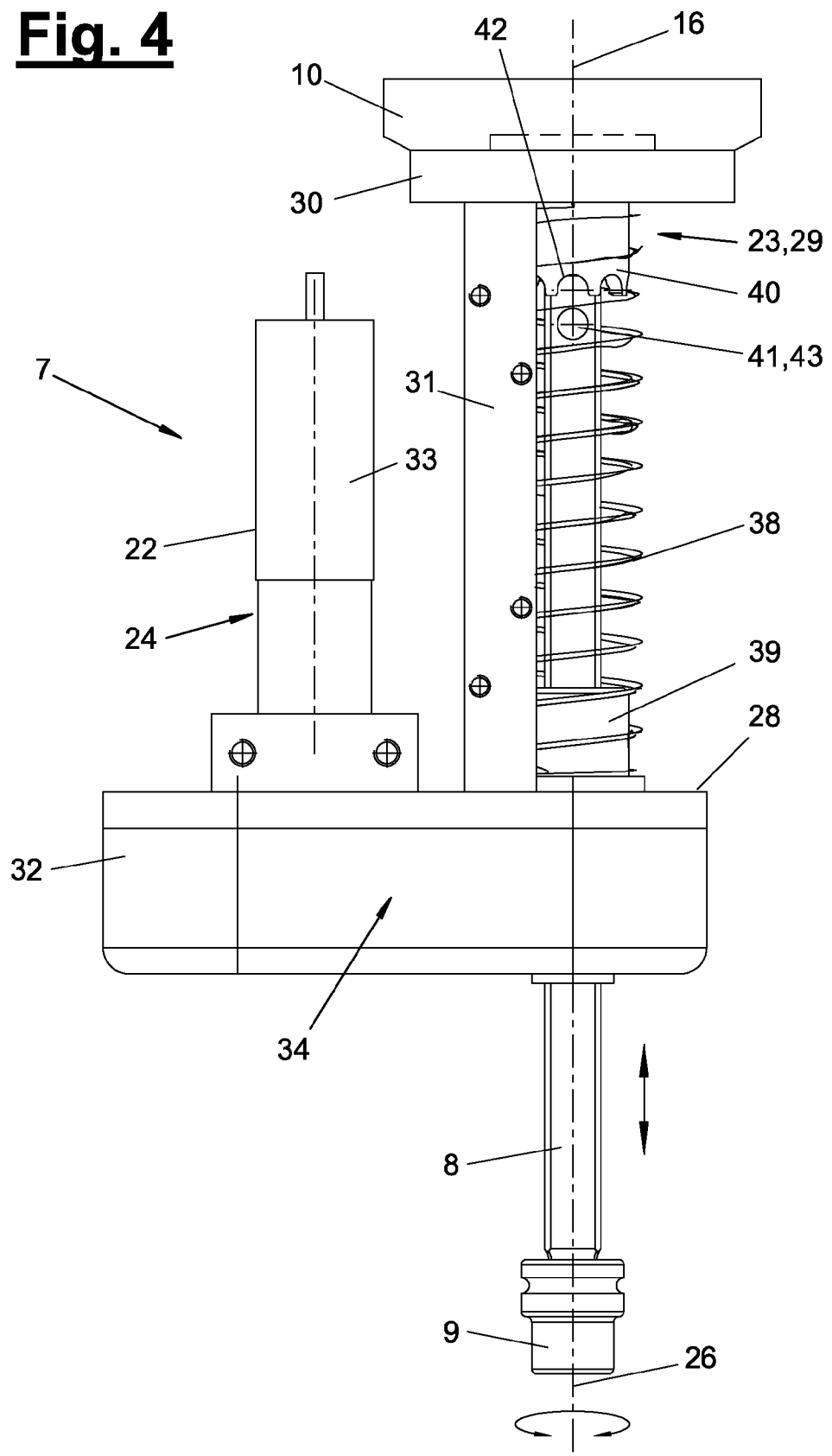
FIG. 4 is a side view showing a variant of a rotating device.
Figure 6:
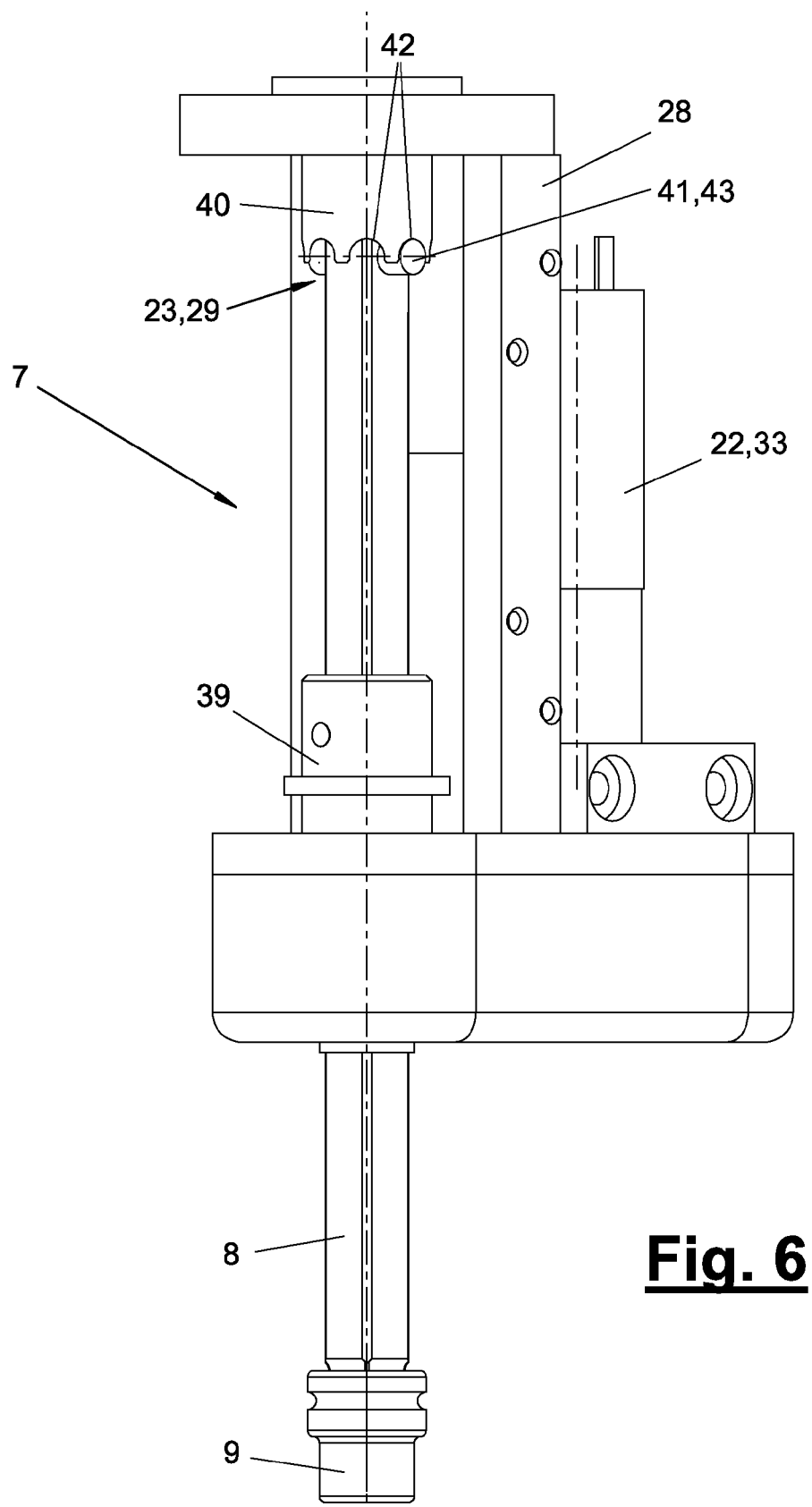
FIG. 6 is another side view of the rotating device from FIGS. 4 and 5.
Figure 7:
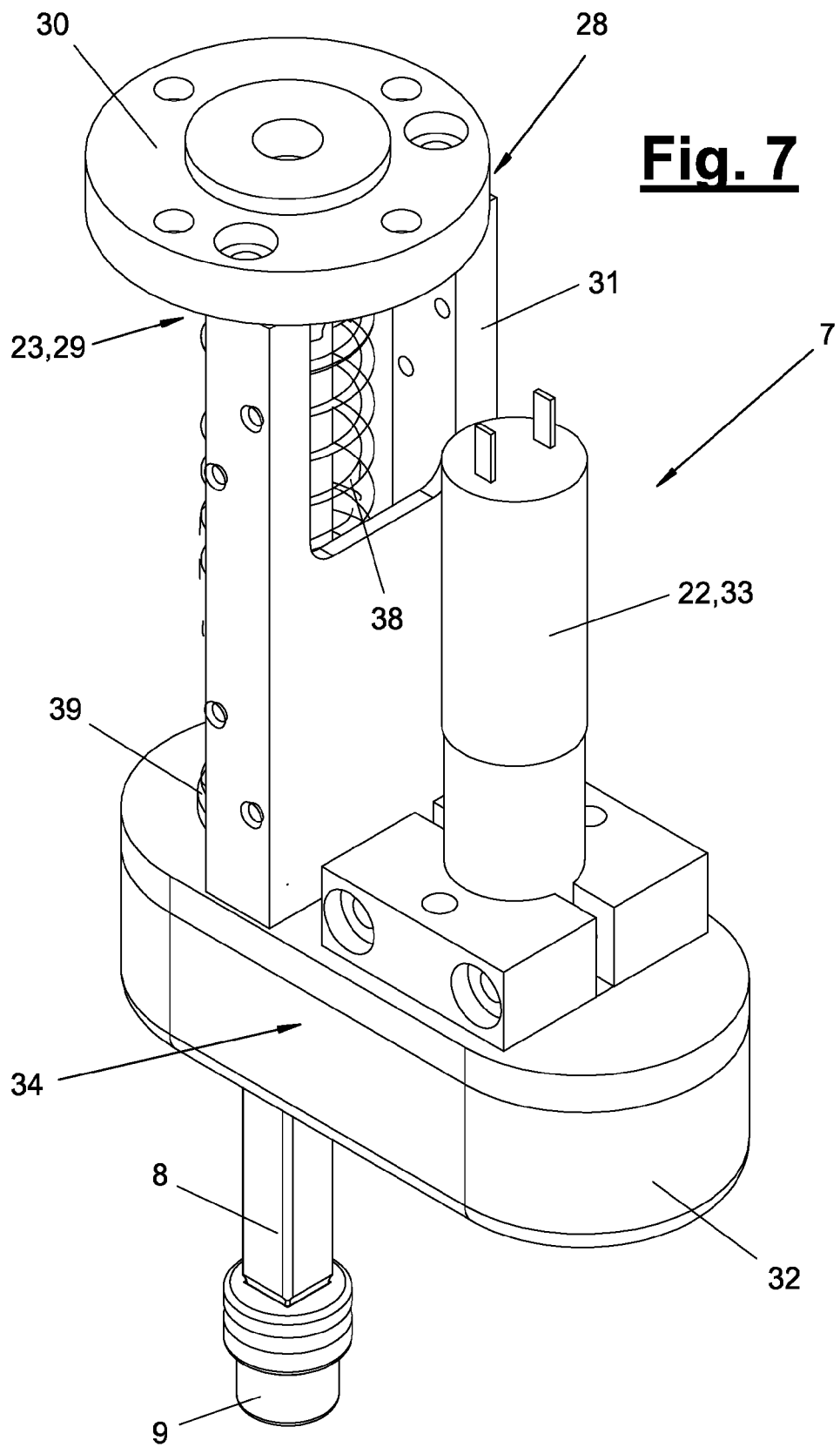
FIG. 7 is perspective view of the rotating device from FIGS. 4 and 5.

The coupling element (40) has a sleeve-like design and has, according to FIGS. 4 and 6, a plurality of axial and preferably equally distributed locking grooves (42) in the sleeve jacket at its lower sleeve edge. The coupling element (40) has a rotationally symmetrical and especially cylindrical jacket form and is arranged coaxially to the driven axis (16) of the robot (6) and the axis of rotation (26) of the rotating tool (8). The coupling element (40) may also form at the same time the frame-side shaft guide (37) and supports the upper end of the rotating tool (8) in the interior space of the sleeve, into which it penetrates more or less deeply depending on the position of the coupling.

The coupling element (41) is formed by one or more, preferably two or more locking bolts (43), which project laterally or radially from the rotating tool (8) and penetrate into the above-mentioned locking grooves (42) and establish a positive-locking and rotationally engaged connection. The contours of the locking bolt (43) and locking grooves (42) have a rounded shape, and they have a taper or wedge shape at least in some areas to establish zero clearance. The coupling (29) can be closed in a rotationally stiff backlash-free manner. Meshing is facilitated by guide-in bevels at the edges of the locking grooves. The locking grooves (42) may be present, moreover, in a larger number than the locking bolts (43). The association of the locking bolts/locking grooves (42, 43) with the coupling elements (40, 41) may also be inverted.

The coupling (29) is opened and closed by an axial displacing motion of the rotating tool (8) relative to the frame (28). To close the coupling (29), the robot (6) performs a feed motion with an axial direction component along the axes (16, 26). The resetting element (38) is tensioned in the process. On the other hand, this opens, due to its release, the coupling (29) when the robot (6) is performing a retraction motion.

For rotational joining, the robot (6) inserts a rotary part (3) picked up at the holding device (9) into a joining opening, and the robot's own sensor system (19) can be used to look for and find the joining position. Coupling (29) may be open now. For screwing in, the rotating drive (22) rotates the rotating tool (8) with a low torque and high speed of rotation with the coupling (29) opened. The rotary motion can be detected and monitored now based on the motor current or in another suitable manner with a sensor (24). The resistive torque rises at the end of the screwing-in operation (the head comes into contact), which can be detected by means of sensor (24) and/or by means of the robot's own sensor system (19) with a sensor (20) (moment of reaction). The robot (6) then performs the axial feed motion mentioned, while the rotating tool (8) is held and supported in a rotary stiff manner at the joining position and the frame (28) with the coupling element (40) is correspondingly displaced relative to the rotating tool (8).

Correct closing of the coupling (29) can be detected by means of the robot's own sensor system (19) based on the type and value of the feed motion and also of the loads occurring in the process. The engagement of the coupling elements (40, 41) can be facilitated by mutually adapting the rotation positions due to a resilience function of the robot axis (7) or of the driven axis (16). The robot may perform a small rotary motion if needed. The position the robot (6) and the robot axes (I-VII) which are present in the closed state of the coupling (29) can be detected. The robot (6) then performs its own rotary motion about the driven axis (16) to tighten the rotary part (3).

If the angle of rotation of the driven element (10) that is available on the driven side is smaller than the necessary tightening angle, the robot (6) can operate in a ratchet-like manner. At the end of its own permissible angle of rotation, it performs a limited retracting motion while releasing the coupling (29), it rotates back the driven element (10), reengages the coupling and continues the tightening motion. The rotary motion and the entire, possibly added-up angle of rotation or the rotary position reached and even the tightening torque can now be detected by the robot's own sensor system (19), especially the sensors (20, 21). As in the first exemplary embodiment, tightening can be concluded when a preset tightening torque and/or a preset angle of rotation or a rotary position is reached.

A rotational loosening process can also be carried out with the rotating device (7) and the robot (6) by the robot (6) feeding the rotating tool (8) with the holding means (9) to a rotary part (3), possibly looking for the position and meshing. The coupling (29) is also closed by a feed motion of the robot (6), so that the untightening torque can subsequently be applied by the robot (6) about the driven axis (16) to the rotating tool (8). The above-described ratchet function can be used if a greater angle of rotation is necessary for untightening. The end of untightening can be detected by the robot's own sensor system (19). To unscrew the rotating part (13), the coupling (29) can be subsequently opened by a retracting motion of the robot (6) and the rotating drive (22) can be actuated. The rotating drive (22), especially its motor (33), and a sensor (24), which is possibly present, are connected to the robot control (11) and are possibly also controlled or regulated by this.

Various variants of the embodiments shown and described are possible. On the one hand, the robot (6) may vary in terms of the number and design of its members (12, 13, 14, 15) and also of its driven axes (I-VII). It may have any desired number and combination of rotatory and/or translatory axes, and the axis drives and mounts of these axes also have correspondingly different designs.

The end member (12) has the movable driven element (10) with the driven and controlled or regulated seventh axis (VII) in the embodiment shown. In another embodiment, the end member (12) may have a rotary stiff connector in unison for the rotating device (7), wherein the end member (12) is, in turn, rotated in relation to another, upstream member, and this axis of rotation may have the same design and function as the axis (VII) of the driven element (10). The driven axis of rotation of the robot (6) may thus be a robot axis other than axis (VII) or the axis of rotation (16).

Furthermore, the robot (6) may have another and conventional design and shape of its members. It may also have a heavier weight. In addition, the shape and design of the sensor system (19) is also variable. A sensor detecting loads, especially torques, may likewise be arranged at the rotating device (7) and possibly connected to a common control (11). As an alternative, sensors for detecting a rotation, especially a rotary motion and/or a rotary position, may be omitted, in which case only loads and especially torques may possibly be detected because of a necessary tightening torque. In addition, other embodiments and arrangements of the sensors (20, 21, 24) are possible to assume the said functions of the sensor system (19). A single rotating tool (8) is arranged at the rotating device (7) in the embodiment shown. In a variation of this, the rotating device (7) may carry a multiple rotating tool or a tool magazine, e.g., a revolver, with a plurality of rotating tools (8).

While specific embodiments of the invention have been shown and described in detail to illustrate the application of the principles of the invention, it will be understood that the invention may be embodied otherwise without departing from such principles.

The invention claimed is:

1. A working device for the rotational joining and/or loosening of rotary parts, the working device comprising:
   a multi-member robot with an end member having a driven axis of rotation;
   a tool; and
   an independently driven rotating device, the tool being connected to the independently driven rotating device for rotating the tool, wherein the end member of the robot carries the independently driven rotating device with the tool, wherein the independently driven rotating device defines means for rapidly screwing in or unscrewing rotary parts and wherein the robot end member defines means for tightening or untightening the rotary parts, wherein:
   the means for rapidly screwing in or unscrewing rotary parts of the rotating device and the means for tightening or untightening the rotary parts of the robot end member differ from each other in terms of speed of rotation and torque;
   the means for tightening or untightening the rotary parts of the robot end member provides a lower speed of rotation and a higher torque than the means for rapidly screwing in or unscrewing rotary parts of the rotating device; and
   the means for rapidly screwing in or unscrewing rotary parts of the rotating device provides a higher speed of rotation and a lower torque than the means for tightening or untightening the rotary parts.

2. A working device in accordance with claim 1, wherein the end member of the robot performs a rotary motion that is independent of a rotary motion of the rotating tool provided by the means for tightening or untightening the rotary parts.

3. A working device in accordance with claim 1, wherein the rotating drive comprises an electric d.c. motor and a gear mechanism.

4. A working device in accordance with claim 1, wherein:
   a rotary mobility of the rotating device can be blocked, wherein the rotary motion and a tightening or untightening torque of the robot are transmitted to the rotary part for tightening or untightening; and
   the rotating device has a controllable blocking device for blocking the rotary mobility of the rotating device.

5. A working device in accordance with claim 4, wherein the rotating device has a controllable blocking device for blocking the rotary mobility of the rotating device.

6. A working device in accordance with claim 5, wherein:
   the end member comprises a driven element rotatable about the driven axis and a controllable rotating drive connected with the driven element;
   the blocking device comprises a coupling controllable by the robot between the driven element and the rotating tool.

7. A working device in accordance with claim 6, wherein the coupling is closed or in a coupled state and opened or in a decoupled state by a feed motion of the robot.

8. A working device in accordance with claim 7, wherein:
   the rotating device further comprises a frame;
   the rotating tool is guided axially movably in the frame of the rotating device; and
   the coupling includes a resetting element opening the coupling.

9. A working device in accordance with claim 8, wherein:
   the frame is connected to the driven element; and
   the coupling includes a coupling element arranged at the frame and a coupling element arranged at the rotating tool.

10. A working device in accordance with claim 1, wherein the rotating tool comprises a shaft connected to the rotating drive of the rotating device in a rotationally engaged manner as well as axially displaceably.

11. A working device in accordance with claim 10, further comprising a sensor system detecting an end of a screwing in or unscrewing operation.

12. A working device in accordance with claim 11, further comprising a sensor system detecting at least one of a load, a torque, a rotary motion and a rotary position.

13. A working device in accordance with claim 1, wherein the robot has one or more force-controlled or force-regulated axes.

14. A working device in accordance with claim 1, wherein the robot has at least one resilient axis with resiliency regulation including at least one of a pure force regulation and a combination of position and force regulation.

15. A working device in accordance with claim 14, wherein the rotating device is held and guided by means of the at least one resilient axis such that the rotating device is able to perform evading motions in an elastic manner.

* * * * *